United States Patent Office 2,861,097
Patented Nov. 18, 1958

2,861,097

BENZYL ESTERS OF POLYCHLOROALIPHATIC MONOCARBOXYLIC ACIDS

Herman O. Senkbeil and Charles T. Pumpelly, Midland, Mich., assignors to The Dow Chemical Company, Midland, Mich., a corporation of Delaware No Drawing. Application November 2, 1956
Serial No. 619,962

6 Claims. (Cl. 260—487)

This invention relates to the benzyl esters of the polychloroaliphatic monocarboxylic acids having the formula

Y—O—R wherein R represents a polychloroacyl radical of the aliphatic series containing from 3 to 5 carbon atoms, inclusive, and Y represents a radical selected from the group consisting of

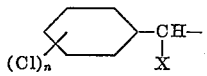

and

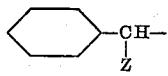

in which X represents hydrogen, methyl, ethyl, chloromethyl or chloroethyl, Z represents chloromethyl or chloroethyl and $n$ represents an integer from 1 to 3, inclusive. These compounds are crystalline solids or viscous liquids somewhat soluble in many organic solvents and substantially insoluble in water. They have been found to be active as plant growth control materials and are adapted to be employed for the control of the growth and the killing of weeds and for the sterilization of soil with regard to the growth of plants. They are also useful as parasiticides for the control of insect and fungal organisms such as *Rhizoctonia solani*.

The new compounds may be prepared by the reaction of a polychloroaliphatic monocarboxylic acid such as 2,2-dichloropropionic acid, 2,2,3-trichloropropionic acid, 2,2-dichlorobutyric acid, 2,2,3-trichlorobutyric acid, 2,2-dichloroisovaleric acid or 2,2,3-trichlorovaleric acid with a benzyl alcohol of the formula

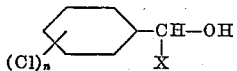

or

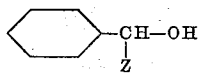

The reaction may be carried out in the presence of an esterification catalyst such as sulfuric acid, phenol sulfonic acid or a cation exchange resin in the acid form and conveniently in a water-immiscible solvent such as ethylene dichloride or toluene. The reaction takes place smoothly at the temperature range of from 75° to 180° C. The molar ratio of the reactants to be employed is not critical since some of the desired product is produced with any proportion of the reagents. However, good results are obtained when employing substantially equimolecular proportions of the reactants. The employment of an excess of the alcohol and the removal of the water of reaction as formed generally results in optimum yields.

In carrying out the reaction, the polychloroaliphatic monocarboxylic acid, benzyl alcohol and catalyst, if employed, are admixed and the resulting mixture heated at a temperature of from 75° to 180° C. for a period of time to complete the reaction. In an alternative procedure, the polychloroaliphatic monocarboxylic acid, benzyl alcohol and catalyst, if employed, may be dispersed in a water-immiscible solvent and the mixture heated at the boiling temperature. During the heating, a mixture of water of reaction and some of the solvent is continuously distilled from the reaction zone, condensed, separated and the solvent recycled.

Upon completion of the reaction, the desired product may be separated by fractional distillation under reduced pressure. Where the desired ester is a solid, it may be removed from the cooled reaction mixture by filtration and thereafter recrystallized from various organic solvents. Alternatively, the solvent mixture of the reaction product may be neutralized with an alkali such as dilute aqueous sodium carbonate. The resulting mixture divides into an aqueous layer and a solvent layer. The solvent layer, which contains the ester reaction product is separated, washed with water and fractionally distilled under reduced pressure to separate the desired ester compound.

The following examples illustrate the invention but are not to be construed as limiting:

*Example 1.—2-chlorobenzyl 2,2-dichloropropionate*

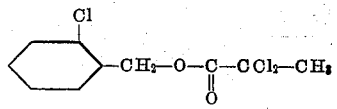

A mixture of 71.25 grams (0.5 mole) of 2-chlorobenzyl alcohol and 71.5 grams (0.5 mole) of 2,2-dichloropropionic acid was dissolved in 200 milliliters of ethylene dichloride and the resulting mixture heated at a temperature of from 102° to 121° C. for 40 hours. This operation was carried out with continuous distillation of the water of reaction as formed and some of the solvent, separation of the water and recycling of the solvent. Upon completion of the esterification, the reaction mixture was fractionally distilled under reduced pressure to separate a 2-chlorobenzyl 2,2-dichloropropionate product as a viscous liquid boiling at 86°–87° C. at 0.1 millimeter pressure and having a refractive index $n/D$ of 1.5300 at 25° C. This produce analyzed 39.5 percent chlorine compared to the theoretical value of 39.76.

*Example 2.—4-chlorobenzyl 2,2-dichloropropionate*

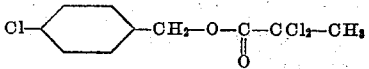

This compound was prepared in a manner similar to that described in Example 1 by heating a mixture of 71.25 grams of 4-chlorobenzyl alcohol and 71.5 grams of 2,2-dichloropropionic acid dissolved in 150 milliliters of ethylene dichloride at a temperature of from 96.5° to 122.5° C. for 44 hours. The 4-chlorobenzyl 2,2-dichloropropionate product obtained boiled at 86°–89° C. at 0.1 millimeter pressure and had a refractive index $n/D$ of 1.5280 at 25° C.

*Example 3.—α-Ethyl-2-chlorobenzyl 2,2-dichloropropionate*

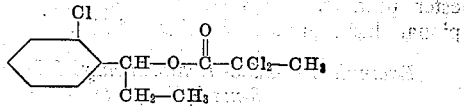

A mixture of 38 grams (0.22 mole) of α-ethyl-2-chlorobenzyl alcohol and 32 grams (0.22 mole) of 2,2-dichloropropionic acid in 150 milliliters of ethylene dichloride was heated at a temperature of from 103° to 106° C. for 41 hours while removing the water of reaction as formed in the usual fashion. Following the heating period, the mixture was washed with water and fractionally distilled under reduced pressure to separate an α-ethyl-2-chlorobenzyl 2,2-dichloropropionate product as a viscous liquid boiling at 99°–105° C. at 0.2 millimeter pressure and having a refractive index n/D of 1.5180 at 25° C.

*Example 4.—α-(Chloromethyl)-benzyl 2,2-dichloropropionate*

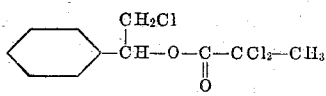

This compound was prepared by heating a mixture of 156.6 grams (1.0 mole) of α-(chloromethyl)-benzyl alcohol, 143 grams (1.0 mole) of 2,2-dichloropropionic acid and 200 milliliters of ethylene dichloride. The heating was carried out for 62 hours at a temperature of from 102° to 127° C. while the water of reaction was continuously removed with a portion of the ethylene dichloride. Upon completion of the reaction, the reaction mixture was washed with water and fractionally distilled under reduced pressure to separate an α-(chloromethyl)-benzyl 2,2-dichloropropionate product boiling at 86°–88° C. at 0.1 millimeter pressure and having a refractive index n/D of 1.5235 at 25° C. This product was found to contain 37.7 percent chlorine compared to the calculated value of 37.85 percent.

*Example 5.—2,3,6-trichlorobenzyl 2,2-dichloropropionate*

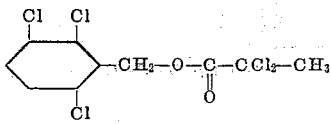

50 grams (0.237 mole) of 2,3,6-trichlorobenzyl alcohol, 34 grams (0.24 mole) of 2,2-dichloropropionic acid and 4.2 grams of p-toluene sulfonic acid were dissolved in 200 milliliters of ethylene dichloride. The resulting mixture was heated at the boiling temperature for 12 hours. During the heating period, the water of reaction was continuously distilled as formed from the reaction vessel as a mixture with some of the solvent. The reaction mixture was then washed with water and the ethylene dichloride was removed by distillation under reduced pressure. The liquid residue was thereafter fractionally distilled under reduced pressure to separate a 2,3,6-trichlorobenzyl 2,2-dichloropropionate product as a viscous liquid boiling at 144°–148° C. at 2.5 millimeters pressure. This product had a saponification equivalent of 324 compared to the calculated value of 336.

*Example 6.—2,3,6-trichlorobenzyl 2,2,3-trichloropropionate*

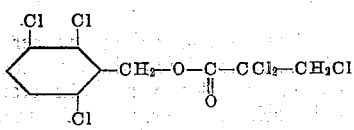

In a manner similar to that described in Example 6, 0.5 mole of 2,2,3-trichloropropionic acid and 0.5 mole of 2,3,6-trichlorobenzyl alcohol are dissolved in 200 milliliters of ethylene dichloride, and the resulting mixture heated at the boiling temperature for 20 hours. The reaction mixture is then washed with water and fractionally distilled under reduced pressure to obtain the desired ester product. 2,3,6-trichlorobenzyl 2,2,3-trichloropropionate has a molecular weight of 371.

*Example 7.—2,3,6-trichlorobenzyl 2,2-dichloro-3-methylbutyrate*

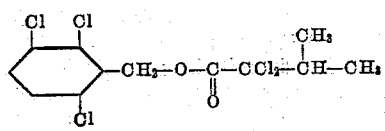

A mixture of 25 grams (0.118 mole) of 2,3,6-trichlorobenzyl alcohol, 25.6 grams (0.15 mole) of 2,2-dichloro-3-methylbutyric acid and 1 milliliter of concentrated sulfuric acid dispersed in 200 milliliters of ethylene dichloride was heated at the boiling temperature for 15 hours. During the heating period, the water of reaction was distilled as formed from the reaction vessel as a mixture with some of the solvent. Upon completion of the reaction, the mixture was washed several times with water and thereafter fractionally distilled under reduced pressure to separate a 2,3,6-trichlorobenzyl 2,2-dichloro-3-methylbutyrate product as a viscous liquid. This product boiled at 150°–155° C. at 0.1 millimeter pressure and had a saponification equivalent of 353 compared to the theoretical value of 364.

*Example 8.—2,3,6-trichlorobenzyl 2,2-dichlorobutyrate*

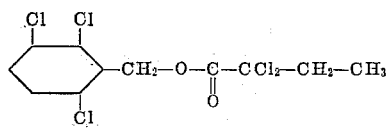

A mixture of 25 grams (0.118 mole) of 2,3,6-trichlorobenzyl alcohol and 23.5 grams (0.15 mole) of 2,2-dichlorobutyric acid dispersed in 200 milliliters of ethylene dichloride was heated at the boiling temperature for 20 hours in the presence of 1 milliliter of sulfuric acid as catalyst. During the heating period, the water of reaction was distilled as formed from the reaction zone along with some of the solvent. Upon completion of the reaction, the reaction mixture was washed with water and fractionally distilled under reduced pressure to separte a 2,3,6-trichlorobenzyl 2,2-dichlorobutyrate product boiling at 132°–135° C. at 0.1 millimeter pressure and having a refractive index n/D of 1.5532 at 25° C.

*Example 9.—2,3,6-trichlorobenzyl 2,2-dichlorovalerate*

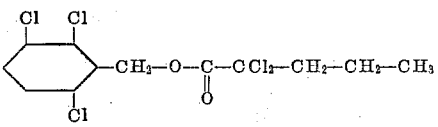

A mixture consisting of 1 mole of 2,3,6-trichlorobenzyl alcohol and 1 mole of 2,2-dichlorovaleric acid dissolved in 200 milliliters of toluene is heated for 16 hours at the boiling temperature in the presence of 1 milliliter of sulfuric acid as a catalyst. The water of reaction along with some of the solvent is continuously removed during the reaction as previously described. Following the heating period, the reaction mixture is washed with water and thereafter fractionally distilled under reduced pressure to separate the desired ester as a viscous liquid. 2,3,6-trichlorobenzyl 2,2-dichlorovalerate has a molecular weight of 365.

In a similar manner, other benzyl esters of polychloroaliphatic monocarboxylic acids may be prepared as follows:

2,4-dichlorobenzyl 2,2-dichlorobutyrate by the reaction of 2,4-dichlorobenzyl alcohol and 2,2-dichlorobutyric acid.

3,4-dichlorobenzyl 2,2-dichlorovalerate by the reaction of 2,2-dichlorovaleric acid and 3,4-dichlorobenzyl alcohol.

2,4,5-trichlorobenzyl 2,2,3-trichloropropionate by the reaction of 2,2,3-trichloropropionic acid and 2,4,5-trichlorobenzyl alcohol.

2,3,6-trichlorobenzyl 2,2,3-trichlorobutyrate by the reaction of 2,3,6-trichlorobenzyl alcohol and 2,2,3-trichlorobutyric acid.

2,3,6-trichlorobenzyl 2,2,3-trichlorovalerate by the reaction of 2,3,6-trichlorobenzyl alcohol and 2,2,3-trichlorovaleric acid.

α-(Chloroethyl)-benzyl 2,2-dichlorobutyrate by the reaction of α-(chloroethyl)-benzyl alcohol and 2,2-dichlorobutyric acid.

α - (Chloromethyl)-2,4-dichlorobenzyl 2,2-dichloro-3-methylbutyrate by the reaction of α-(chloromethyl)-2,4-dichlorobenzyl alcohol and 2,2-dichloro-3-methyl butyric acid.

α - (Chloroethyl) - 3,4 - dichlorobenzyl 2,2-dichlorovalerate by the reaction of α-(chloroethyl)-3,4-dichlorobenzyl alcohol and 2,2-dichlorovaleric acid.

The new ester compounds of the present invention are effective as herbicides for the killing of weeds and the sterilization of soil with regard to plant growth. They are also valuable as parasiticides and are adapted to be employed for the control of fungal and insect organisms such as aphids. For such use, the products may be dispersed on an inert finely divided solid and employed as dusts. Such mixtures may also be dispersed in water with or without the aid of a wetting agent and the resulting aqueous suspensions employed as sprays. In other procedures, the products may be employed as active toxic constituents in oil-in-water emulsions or aqueous dispersions with or without the addition of dispersing and emulsifying agents. In representative operations, 100 percent controls of the growth of the seeds and emerging seedlings of wild oats, radish and millet have been obtained with 2,3,6-trichlorobenzyl 2,2-dichloropropionate when applied at the rate of 50 pounds per acre to soil previously planted with said plant species.

The preferred esters of the present invention are those prepared from the 2,2-dichloro-aliphatic acids and 2,2,3-trichloro-aliphatic acids containing from 3 to 5 carbon atoms, inclusive.

We claim:

1. A benzyl ester of a polychloroaliphatic monocarboxylic acid having the formula

Y—O—R wherein R represents a polychloroacyl radical derived from an alkanoic acid containing from 3 to 5 carbon atoms, inclusive and wherein at least two chlorine atoms are substituted on the carbon atom alpha to the carboxyl group, and Y is a radical selected from the group consisting of

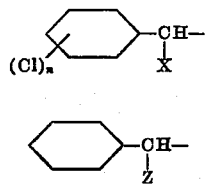

and

in which X is selected from the group consisting of hydrogen, methyl, ethyl, chloromethyl and chloroethyl, Z is selected from the group consisting of chloromethyl and chloroethyl and $n$ represents an integer from 1 to 3, inclusive.

2. 2-chlorobenzyl 2,2-dichloropropionate.
3. α-(Chloromethyl)-benzyl 2,2-dichloropropionate.
4. α-Ethyl-2-chlorobenzyl 2,2-dichloropropionate.
5. 2,3,6-trichlorobenzyl 2,2-dichloropropionate.
6. 2,3,6-trichlorobenzyl 2,2-dichloro-3-methylbutyrate.

References Cited in the file of this patent

UNITED STATES PATENTS

| | | |
|---|---|---|
| 2,417,773 | Martin et al. | Mar. 18, 1947 |
| 2,581,852 | Gilbert | Jan. 8, 1952 |
| 2,674,527 | Baumgartner | Apr. 6, 1954 |
| 2,734,076 | Pumpelly | Feb. 7, 1956 |

FOREIGN PATENTS

| | | |
|---|---|---|
| 255,297 | Switzerland | Jan. 17, 1949 |

OTHER REFERENCES

Reinschneider: Chem. Abstracts, 47(1953), 2131h.